Feb. 25, 1964   A. ALDROPP   3,121,994
HYDRAULIC JET MARINE ENGINE
Filed Jan. 30, 1961   2 Sheets-Sheet 1

Art Aldropp
INVENTOR.

BY Eugene P. Foley
Atty.

Feb. 25, 1964   A. ALDROPP   3,121,994
HYDRAULIC JET MARINE ENGINE
Filed Jan. 30, 1961   2 Sheets-Sheet 2

Art Aldropp
INVENTOR.

BY Eugene D. Farley

Atty.

United States Patent Office 3,121,994
Patented Feb. 25, 1964

3,121,994
HYDRAULIC JET MARINE ENGINE
Art Aldropp, Box 95, Langlois, Oreg.
Filed Jan. 30, 1961, Ser. No. 85,888
4 Claims. (Cl. 60—35.54)

This invention relates to hydraulic jet marine engines for use in propelling boats.

Hydraulic jet marine engines are well known and have significant advantages in driving shallow draft boats rapidly through the water. However, the previously known boats of this class can not be idled for warming up the engine without the inclusion of elaborate and costly clutching apparatus, can not be reversed efficiently, and can not be steered effectively when driven in reverse.

It is the general object of the present invention to provide a hydraulic jet marine engine which overcomes the foregoing disadvantages and which, as a consequence, can be idled without forward progress of the boat even though no clutch is present, which can be reversed efficiently, and which can be steered effectively when running in reverse. Large, passenger-carrying vessels, in which the present engine is installed, accordingly can be operated to great advantage in shallow, swift-flowing rivers, such as the Rouge River of Oregon, where extreme maneuverability is required.

The manner in which the foregoing and other objects of this invention are accomplished will be apparent from the accompanying specification and claims considered together with the drawings in which:

Figure 1:
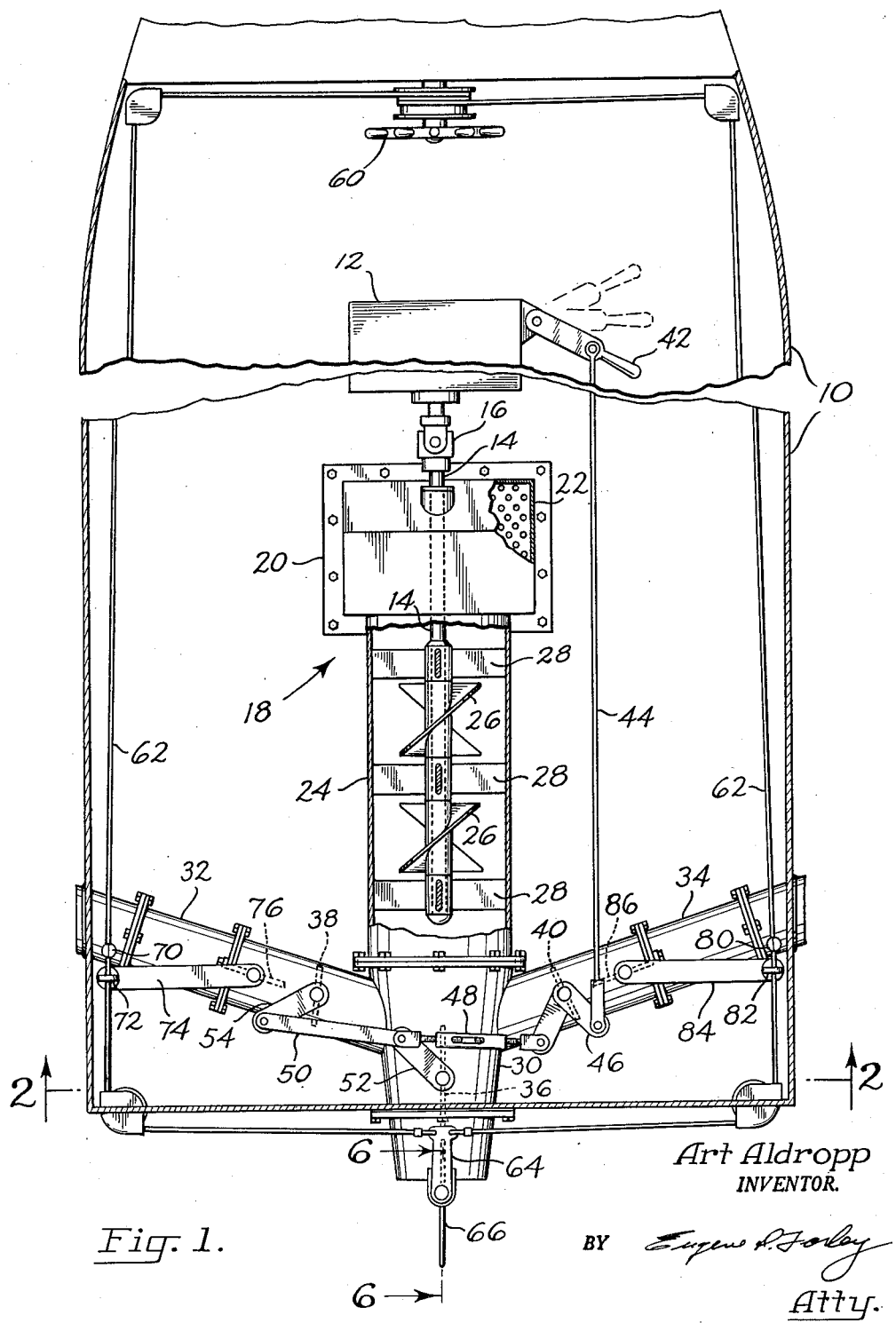
FIG. 1 is a fragmentary plan view of a boat in which the hydraulic jet marine engine of my invention is installed.
Figure 2:
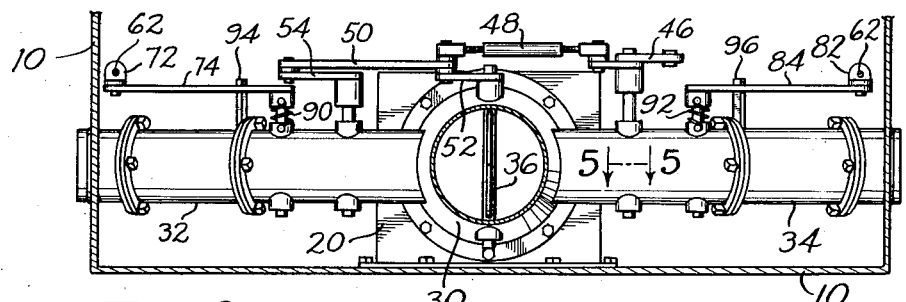
FIG. 2 is a sectional view in elevation taken along line 2—2 of FIG. 1.

In general, the hydraulic jet marine engine of my invention comprises a longitudinal conduit which is arrangeable longitudinally of a boat and has a forwardly located water intake and a rearwardly directed water jet discharge. Propeller means are mounted in the conduit for pumping water through it.

A pair of forwardly angled lateral conduits communicate with the longitudinal conduit behind the propeller means. Each of these is provided with a water jet discharge.

Valve means are provided for driving the engine in forward and reverse directions by controlling the water flow selectively through the rearwardly and laterally directed jet discharges. Steering valve means and controls therefor are located in the lateral conduits for selective operation to turn the boat when the drive valve means are in their position of boat reversal.

Considering the foregoing in greater detail and with particular reference to the drawings:

In the cockpit of a boat 10 is mounted an engine 12 which drives a shaft 14 through coupling 16.

Shaft 14 passes into a longitudinally arranged conduit indicated generally at 18. The forward section 20 of the conduit serves as a water intake chamber and is provided with a grill 22 which admits water from beneath the boat.

The intermediate section 24 of conduit 18 houses one or more propellers 26, which may be of the spiral screw type, vanes 28 being interposed for minimizing turbulence.

Bolted to intermediate section 24 of the conduit is a water jet discharge section 30 which passes out through a central opening in the boat transom.

A pair of forwardly angled lateral conduits 32, 34 communicate with section 30 of longitudinal conduit 18 in a location behind propellers 26. The degree of forward angling of these conduits is variable to suit the installation and the operator's purpose. In general, it should be sufficient to impart a reverse motion to the boat when water is directed through them.

Valve means, termed herein "drive valve means," are provided for determining the forward or reverse progress of the boat. For this purpose there is provided a centrally located butterfly valve 36 in rearwardly directed jet discharge 30. Similar butterfly valves 38, 40 are installed in each of lateral water jet discharge conduits 32, 34.

To synchronize the operation of valves 36, 38, 40, a lever 42 is located forwardly at a station convenient to the operator. This lever is connected by rod 44 to a bell crank 46 which is fixed to the shaft of valve 40.

Bell crank 46 is connected through adjusting turnbuckle 48 to a link 50. This link is pivotally connected at one of its ends to a lever 52 fixed to the shaft of valve 36. Its other end is connected pivotally to a lever 54 which is fixed to the shaft of valve 38.

Steering means also are provided for steering the boat efficiently when it is moving in either forward or reverse directions. Hence there is provided a conventional wheel 60 about which is reeved a pulley-supported steering cable 62. The latter is connected to a lever 64 which is fixed to the shaft of a rudder 66. The rudder is mounted centrally at the rear of jet 30 and steers the boat effectively when it is moving forwardly.

Figure 3:
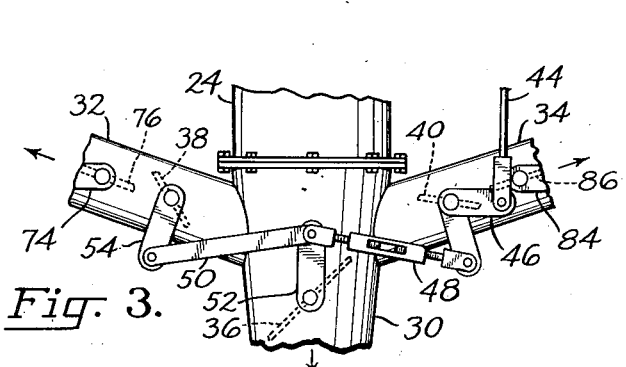
FIGS. 3 and 4 are fragmentary plan views illustrating respectively the idling and reversing positions of the presently described engine.
Figure 4:
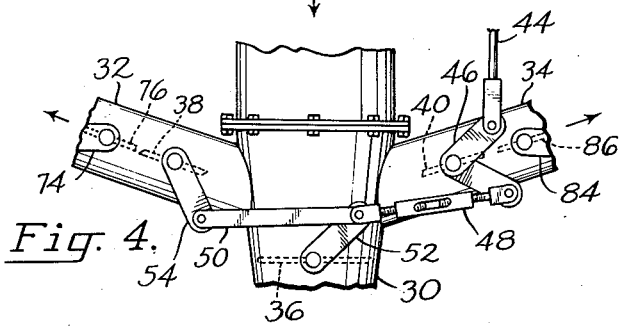
Figure 5:
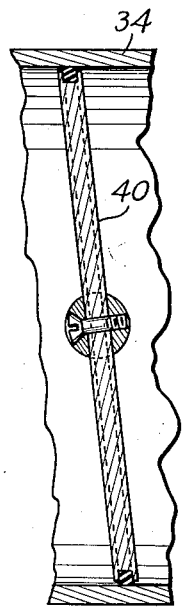
FIG. 5 is a fragmentary sectional view taken along line 5—5 of FIG. 2 and illustrating the construction of a valving mechanism employed in the instant invention.
Figure 6:
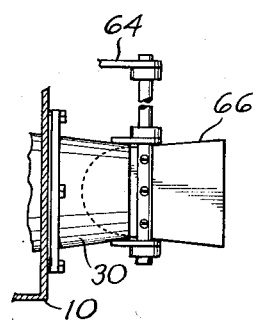
FIG. 6 is a detail view in side elevation taken along line 6—6 of FIG. 1 and illustrating the construction of a rudder assembly used in steering a boat in which the presently described engine is installed.

To steer the boat efficiently when it is moving rearwardly, there are provided in each of lateral conduits 32, 34 valve means, termed herein "steering valve means," the construction and mode of operation of which are particularly apparent in FIGS. 1, 3 and 4.

On the port side of the boat steering cable 62 is provided with a fixed stop 70 positioned for engagement with a guide 72 through which the cable passes. Guide 72 is mounted on a lever 74 which is fastened to the end of the shaft of a butteryfly valve 76 mounted in a lateral conduit 32 in the outboard direction from drive valve 38.

Similarly, steering cable 62 on the starboard side of the boat mounts a stop 80 which is positioned for abutment with a guide 82 through which the cable passes. Guide 82, in turn, is mounted on a lever 84 which is fixed to the shaft of a butterfly valve 86 located in lateral conduit 34 in the outboard direction from drive valve 40.

To maintain steering valves 76, 86 normally in an open position, there are provided coil springs 90, 92 wrapped operatively about the upwardly extending shafts of the valves. Posts 94, 96 extend upwardly from lateral conduits 32, 34 and serve as stops for limiting the spring-actuated rotation of the valves in the direction of valve opening.

*Operation*

To operate a boat driven by the herein described engine, motor 12 may be started with the controls in the position of FIG. 3. In this position, all of the valves are open so that water is discharged from all of the jets, i.e. from jets 30, 32, 34. In this position of the valves the opposed forces of the jets balance each other and the boat remains stationary. Hence the motor may be idled and warmed up even though a clutch assembly is not included in the installation. Also, stability is imparted to the boat for loading and unloading.

When it is desired to drive the boat forwardly, lever 42 is adjusted to the position of FIG. 1. In this position, drive valve 36 is open so that water is blasted through rearwardly directed jets 30, driving the boat forwardly. Drive valves 38, 40 are closed.

When it is desired to reverse the boat, lever 42 is adjusted until the drive valves are in the position of FIG. 4. In this position, drive valve 36 is closed while drive valves 38, 40 are open. Accordingly, water is prevented from driving outwardly through jet 30, but is driven forcibly outwardly through jets 32, 34 reversing the boat at a speed commensurate with the engine speed and amount of angle of the lateral conduits.

When the boat is moving forwardly, as in FIG. 1, it may be steered by operation of rudder 66. Steering valves 76, 86 are inoperative since drive valves 38, 40 are closed, shutting off the flow of water through lateral conduits 32, 34.

However, when the boat is in the reversing position of FIG. 4, with drive valves 38, 40 open and water flowing through lateral conduits 32, 34, turning wheel 60 clockwise, results in abutment of stop 80 with guide 82. This closes steering valve 86 but does not affect steering valve 76. The result is to increase the flow of water through conduit 32 at the expense of the flow through conduit 34, thereby turning the boat in a counterclockwise direction. Moving the helm in the opposite direction will have, of course, an opposite result.

Thus it is apparent that by the present invention I have provided an hydraulic jet marine engine which fully accomplishes the objectives of the invention, i.e. to provide a jet engine which can be idled without the use of a clutch, which can be reversed efficiently, and which can be steered effectively when moving in reverse direction.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An hydraulic jet marine engine comprising a longitudinal conduit arrangeable longitudinally of a boat and having a forwardly located water intake and a rearwardly directed forward drive jet discharge, propeller means in the conduit for pumping water therethrough, a pair of forwardly-angled, laterally directed reversing conduits communicating with the longitudinal conduit behind the propeller means and each provided with a reverse drive jet discharge, valve means in the forward drive jet discharge movable between open and closed positions for controlling the water flow through the forward drive jet discharge, valve means in the reversing conduits movable between open and closed positions for controlling the water flow through the reverse drive jet discharges, valve control means operatively interconnecting the valve means in the forward drive jet discharge and the valve means in the reversing conduits and operable to adjust the water flow through the forward drive jet discharge and the reverse drive jet discharges as required for idling the boat and for driving the boat in forward and reverse directions, steering valve means in each of the reversing conduits, and steering valve control means arranged for selective operation of the steering valve means for driving and steering the boat in the reverse direction.

2. The hydraulic jet marine engine of claim 1 wherein the steering valve means comprise butterfly valves mounted for operation in the reversing conduits.

3. The hydraulic jet marine engine of claim 2 wherein the steering valve control means comprises a lever attached to the pivot of each butterfly valve, a guide on each lever, a steering cable passed through each guide, and stop means on the steering cable for engagement with the guide.

4. An hydraulic jet marine engine comprising a longitudinal conduit arrangeable longitudinally of a boat and having a forwardly located water intake and a rearwardly directed forward drive jet discharge, propeller means in the conduit for pumping water therethrough, a pair of forwardly-angled, laterally directed reversing conduits communicating with the longitudinal conduit behind the propeller means and each provided with a reverse drive jet discharge, valve means in the forward drive jet discharge movable between open and closed positions for controlling the water flow through the forward drive jet discharge, valve means in the reversing conduits movable between open and closed positions for controlling the water flow through the reverse drive jet discharges, and valve control means operatively interconnecting the valve means in the forward drive jet discharge and the valve means in the reversing conduits, the valve control means having a pair of limit positions and an intermediate position, the valve control means in one of its limit positions opening the valve means in the forward drive jet discharge and closing the valve means in the reversing conduits for providing forward drive, and in its other limit position opening the valve means in the reversing conduits and closing the valve means in the forward drive jet discharge for providing reverse drive, and in its intermediate position partially opening all of said valve means for providing substantially equal forward and reverse drive.

References Cited in the file of this patent

UNITED STATES PATENTS

| | | |
|---|---|---|
| 164,033 | Pratt | June 1, 1875 |
| 340,237 | Nagel | Apr. 20, 1886 |
| 1,690,043 | Wallis | Oct. 30, 1928 |

FOREIGN PATENTS

| | | |
|---|---|---|
| 204,949 | Australia | Dec. 12, 1956 |